United States Patent [19]
Cole

[11] 3,751,700
[45] Aug. 7, 1973

[54] COMMUTATOR HAVING COMMUTATING SEGMENTS ADHESIVELY BONDED IN SHEAR TO A BASE MEMBER

[75] Inventor: Quintin Perry Cole, Erie, Pa.

[73] Assignee: General Electric Company, Lynn, Mass.

[22] Filed: Mar. 1, 1972

[21] Appl. No.: 230,677

Related U.S. Application Data

[63] Continuation-in-part of Ser. No. 77,071, Oct. 1, 1970, abandoned.

[52] U.S. Cl. ............................... 310/235, 310/236
[51] Int. Cl. ......................................... H02k 13/04
[58] Field of Search ................... 310/233, 234, 235, 310/236; 29/597; 252/514; 264/272

[56] References Cited
UNITED STATES PATENTS

| | | | |
|---|---|---|---|
| 3,473,063 | 10/1969 | Forste | 310/235 |
| 2,645,732 | 7/1953 | Marsal | 310/236 |
| 2,645,733 | 7/1953 | Marsal | 310/235 |
| 3,290,527 | 12/1966 | Habermann | 310/236 |
| 1,401,708 | 12/1921 | Kempton | 310/236 |
| 2,990,488 | 6/1961 | Schafer | 310/235 |
| 2,956,190 | 10/1960 | Bechstein | 310/235 |

FOREIGN PATENTS OR APPLICATIONS

| | | | |
|---|---|---|---|
| 1,120,015 | 7/1968 | Great Britain | 310/233 |

*Primary Examiner*—R. Skudy
*Attorney*—James C. Davis, Jr. et al.

[57] ABSTRACT

A commutator in which a base member having a mounting portion of substantial axial extent and an annular planar surface axially facing the mounting portion has electrically conductive commutating segments secured to the mounting portion. Each commutating segment has a planar surface at an end thereof closely adjacent the annular planar surface, and the end planar surface is adhesively bonded to the annular planar surface by a relatively thin layer of adhesive material which is electrically conductive and has high dielectric strength. The thickness of the adhesive layer is sufficiently small that the bonds between the layer and the adjacent surfaces are substantially stressed in shear during operation of the commutator in a dynamoelectric machine.

8 Claims, 5 Drawing Figures

COMMUTATOR HAVING COMMUTATING SEGMENTS ADHESIVELY BONDED IN SHEAR TO A BASE MEMBER

RELATED APPLICATIONS

This application is a continuation-in-part of copending patent application Ser. No. 77,071, now abandoned for "Bonded Commutator Having Improved Peel Resistance," filed on Oct. 1, 1970 in the name of Quintin P. Cole and assigned to the assignee of this application. The invention of this application is also related to the invention described and claimed in copending patent application Ser. No. 77,130, now abandoned (Docket No. 21-DC-169) for "Adhesively Bonded Commutator," filed on Oct. 1, 1970 in the name of John F. Binder and also assigned to the present assignee, this invention comprising an improvement on the commutator construction of application Ser. No. 77,130, now abandoned.

BACKGROUND OF THE INVENTION

1. Field of the Invention

This invention relates to adhesively bonded commutators for use in dynamoelectric machines and, more particularly, to such commutators in which the retention of commutating segments is enhanced by adhesive bonds stressed in shear during commutator operation.

2. Description of the Prior Art

D-C motors and generators of the industrial type include as an important component thereof a cylindrical rotating commutator having a plurality of spaced-apart commutating segments on the outer periphery thereof. Since in an industrial type machine each commutating segment must be capable of conducting substantial amounts of electrical current, the commutating segments have substantial mass and, as a result, are subject to substantial centrifugal forces during normal operation. These centrifugal forces must obviously be resisted in order to maintain the integrity of the structure. It is not, however, sufficient that the commutator merely be held together mechanically during operation; it is also essential that the structure exhibit a high degree of mechanical and thermal stability throughout the entire operating range. It has been found that mechanical and thermal instability resulting from uneven heating, rapid acceleration and deceleration, and the like can result in heavy, intolerable sparking and excessive wear and damage to not only the commutator, but also other machine components such as the brushes in contact with the commutator.

By the invention of patent application Ser. No. 230,676, adhesively bonded commutators having a high degree of mechanical and thermal stability have been developed. Under most conditions, these adhesively bonded commutators retain their integrity well. It is possible, however, by mechanical shock to the exposed segment ends at the front end of the commutator, i.e., at the end of the commutator away from the armature core, to overstress the adhesive bond between the metallic commutator segments and the outer cylindrical surface of the base member. Thereafter, failure of the commutator assembly may occur through gradual lifting or peeling of the commutation segment from the front end of the commutator segment to the end thereof near the armature core.

SUMMARY OF THE INVENTION

It is therefore an object of this invention to provide an improved commutator of the adhesively bonded type.

Another object of this invention is to provide an adhesively bonded commutator in which commutating segments are secured to a base member with a high degree of peel resistance.

Yet another object of this invention is to provide an adhesively bonded commutator in which the ends of commutating segments are substantially protected against certain mechanical shocks and resulting separation from a base member through progressive peeling action.

Briefly stated, in carrying out the invention in one form, a commutator includes a base member having a mounting portion of substantial axial extent and an annular planar surface at an end of the mounting portion axially facing the mounting portion. A plurality of electrically conductive commutating segments are peripherally secured to the mounting portion, each of the commutating segments having a planar end surface parallel to and closely adjacent the annular planar surface. A layer of adhesive material is interposed between the end planar surfaces to the annular surface, the adhesive material preferably being selected from the group of adhesives consisting of epoxies and polyimides. In accordance with the invention, the thickness of the adhesive layer is sufficiently small, preferably less than 0.020 inch, to assure that the bonds of the adhesive layer with the end surface of the commutating segments and the annular planar surface will be substantially stressed in shear before any separation will occur between the commutating segments and the mounting portion. Furthermore, the portion of the base member defining the annular planar surface substantially protects the adjacent ends of the commutating segments against certain forms of mechanical shock, thereby also helping prevent initial separation of the segments from the axial mounting portion. By a further aspect of the invention, spacing means are provided for maintaining a predetermined minimum thickness of the adhesive layer.

BRIEF DESCRIPTION OF THE DRAWINGS

This invention may be better understood by reference to the following detailed description taken in conjunction with the accompanying drawings in which.

DETAILED DESCRIPTION

Figure 1:
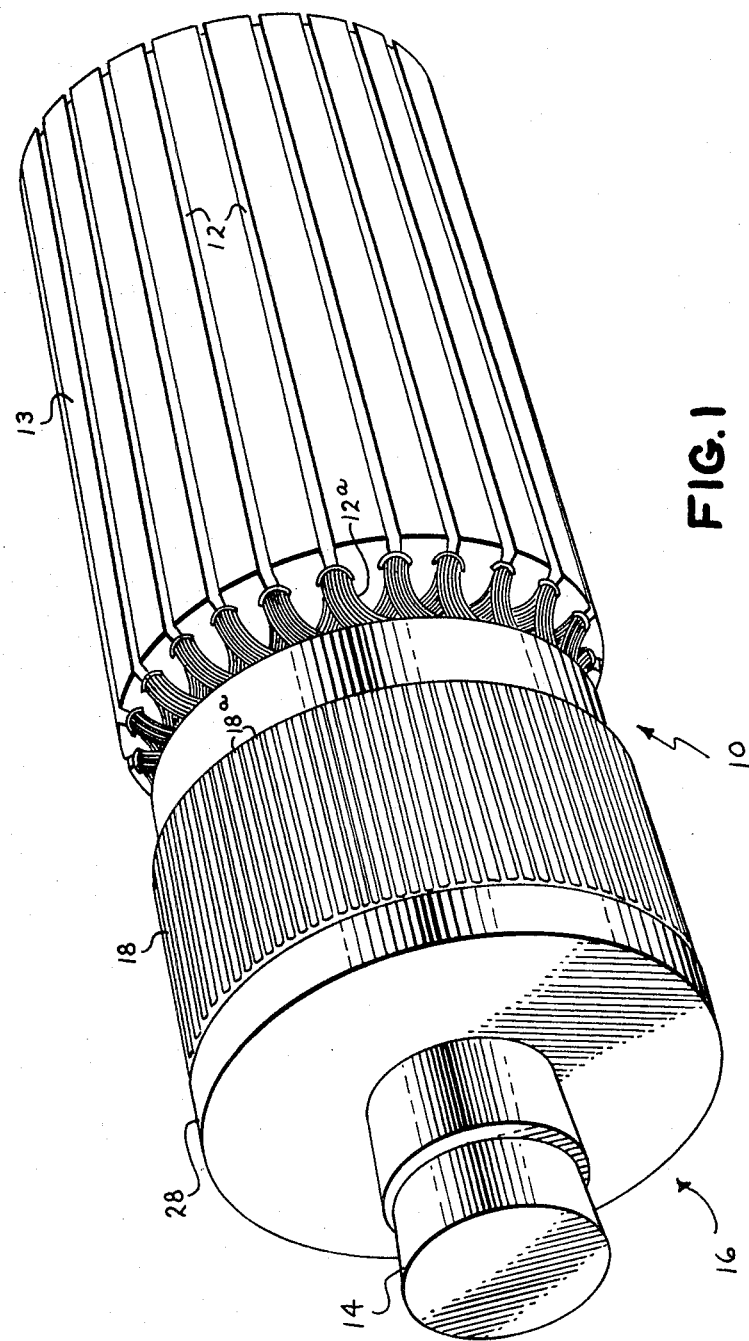
FIG. 1 is a perspective view of an armature for a typical industrial-type dynamoelectric machine incorporating a commutator of the present invention.

Referring first to FIG. 1, there is shown an armature assembly 10 for an industrial-type dynamoelectric machine, including specifically armature coils 12, armature shaft 14 and a commutator assembly which includes a base member 16 and elongated commutation segments 18 mounted thereon. The axially inner ends of segments 18a are in electrical contact with armature coils 12 through lead wires 12a.

Figure 2:
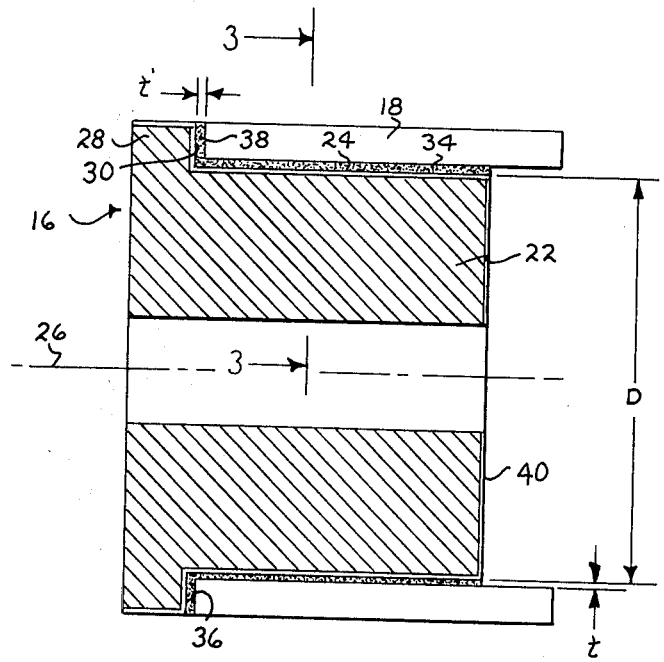
FIG. 2 is a longitudinal cross sectional view of the commutator shown in FIG. 1.
Figure 3:
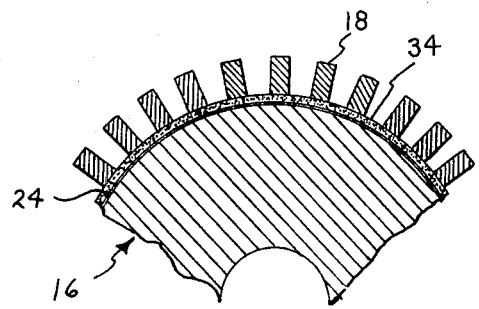
FIG. 3 is a cross sectional view of the commutator taken along viewing line 3—3 of FIG. 2.
Figure 4:
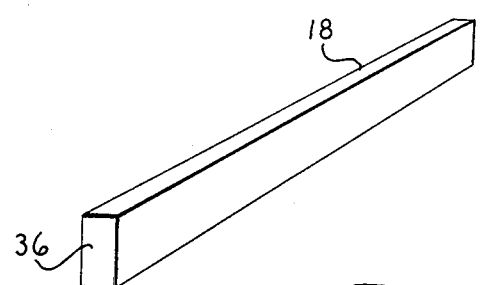
FIG. 4 is a perspective view of the commutator segment used in the commutator of this invention.

The commutator of FIG. 1 is shown in longitudinal and radial cross section in FIGS. 2 and 3, respectively. As shown therein, the base member 16 includes a primary mounting portion 22 having a cylindrical outer surface 24 peripherally surrounding a central axis 26 and an outwardly projecting annular flange 28 at the axially outer end of the base member 16. The flange 28 forms an annular planar surface 30 axially facing the mounting portion 22 and its cylindrical surface 24. The commutating segments 18 are peripherally spaced about the cylindrical surface 24 and are adhesively bonded thereto by a layer 34 of adhesive material. In addition, each commutating segment 18 has an end planar surface 36 at its outer end, the segments 18 also being adhesively secured to the base member 16 by a layer 38 of adhesive material between the end surfaces 36 and the annular planar surface 30. As best illustrated by FIG. 4, each of the segments 18 is of relatively simple shape with a rectangular cross section. This is in contrast to the complex shapes of the typical prior art commutating segments for industrial type dynamoelectric machines. The commutator of this invention may be easily mass produced in that the commutating segments 18 may be simultaneously positioned and secured to the base member 16. A preferred assembly method, and preferred apparatus for carrying out the method, are disclosed and claimed by copending patent application Ser. No. 77,131, now abandoned for "Method and Apparatus For Adhesively Bonded Commutators," filed on Oct. 1, 1970, in the name of Michael A. McGrath and assigned to the assignee of this invention.

In accordance with the invention of copending patent application Ser. No. 230,676, the base member 16 is made from a material characterized by extreme rigidity and thermal stability relative to that of the adhesive material forming the bonding layers 34 and 38. It has been found in practice that steel is a particularly suitable material for the base member 16 in that it is extremely rigid relative to common adhesives and has a low coefficient of expansion, on the order of $3.5 \times 10^6$ in./in./° C, relative to suitable adhesives, which generally have coefficients of expansion in the range of $30 \times 10^6$ in./in./° C to $60 \times 10^6$ in./in./° C. Under suitable conditions, the base member 16 may be made of various metallic and non-metallic materials, or combinations thereof, depending on cost and mechanical stress and environmental conditions in the ultimate intended application. Those prepared from electrically conductive materials must of course be insulated from the commutator segment. In the case of metallic base members, steel, aluminum, cast iron, etc. may be used with an insulating covering or coating consisting of molded epoxy glass, molded polyimide glass, or plasma sprayed ceramic. A preferred embodiment is a steel base member having a plasma sprayed alumina outer coating 40 as illustrated by FIG. 2.

The commutator segments 18 used in the present invention may be made from rectangular or bevelled metal stock. Generally, they are made of copper or a copper alloy selected for specific properties, although aluminum and other metals may be used. When rectangular cross section stock is used, rounded or radiused edges are provided on the bonding surface thereof to minimize stress concentration at the outer limits of this bonding surface. If the segment is made of copper, generally it is degreased with solvent and then acid (bright) dipped prior to bonding the segment to the base member. In some cases, it may be desirable to have a thin layer of zinc diffused on the surface of the copper segment. Among other things, this may improve the bondability of the copper segments. Such a layer may be provided by degreasing with solvent, acid bright dipping, cyanide cleaning, plating the copper segments and then zinc anthen diffusing the zinc into the copper by heat treating it at 180°–250° C.

Depending on the assembly method used, the commutator segments may then be coated on their bonding surfaces with the adhesive to be used or delivered directly to the assembly apparatus. Alternatively, the adhesive may be applied to the copper segment in the assembly apparatus or it may be applied to the base member to which the segments are to be bonded. This may depend, among other things, on the design of the assembly apparatus and the assembly procedure used. Generally, if the base member is heated prior to the assembly, the adhesive is applied to the segment rather than to the base member to avoid premature activation. If ultrasonic vibration is used to provide activation energy, the adhesive may be applied to either the segment or the base member. Application of the adhesive to the segment is preferred in most cases.

Figure 5:
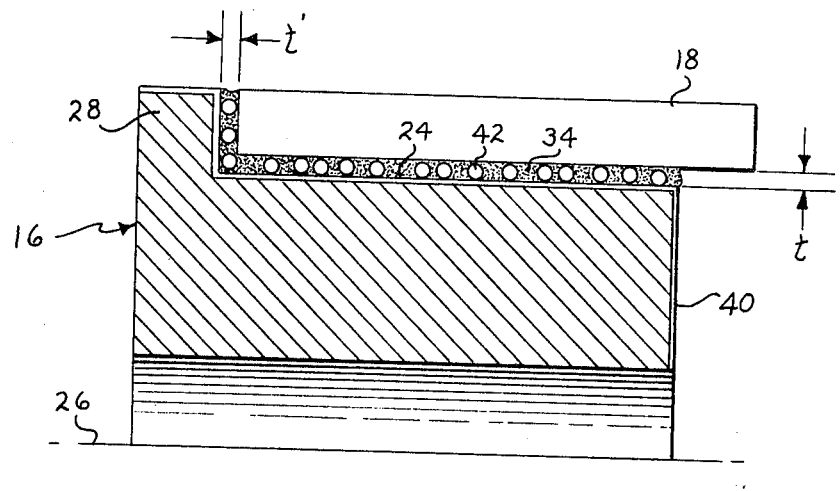
FIG. 5 is an enlarged view of a portion of the adhesive layers between the base member and one of the commutating segments.

The adhesive is generally applied as a viscous liquid and a roller, liquid dispenser, or spray form of application may be used. Such viscous liquid adhesive also includes a spacing filler, such as glass beads 42 (see FIG. 5), to keep the adhesive from being squeezed out from between the segment and the mounting surfaces 24 and 30, thereby starving the bond interfaces of adhesive material. Alternatively, adhesives disposed in a sheet-type supply means can be applied by wrapping the sheet around the commutator shell and placing a sheet adjacent the annular surface 30. Hot melt adhesives may be applied by spray, electrostatic, or fluid bed techniques and combinations of these techniques can also be used with hot melt adhesives. For more detailed consideration of appropriate bonding methods, attention is directed to the said copending application Ser. No. 77,131, now abandoned.

The details of the various adhesive compositions which may be used will be described below.

As taught by the aforesaid patent application Ser. No. 230,676, the adhesive used to provide the bonding layer 34 must be capable of providing a high strength bond when stressed in tension. Further, the adhesive must be electrically non-conductive and have good dielectric strength. The former characteristic is necessary to avoid arc-over between commutation segments at the base thereof due to adhesive material around the commutation segments while the latter characteristic is necessary to avoid voltage-induced breakdown of the adhesive material due to voltage differentials between commutation segments and the rotating base element to which the segments are mounted. Further, it is desirable that the adhesive be capable of withstanding high temperatures since such temperatures are often encountered in larger d-c motors and generators. Of course, the adhesive must also have good aging characteristics. As pointed out in the aforesaid patent application Ser. No. 230,676 certain heat cured epoxies and polyimides have been found to be particularly effective in providing the bonding layer 34. For disclosure of specific resins suitable for use as the adhesive material, attention is directed to the said copending patent application.

As pointed out previously, the annular flange 28 protects the axially outer ends of the commutating segments 18 against mechanical abuse and damage. Through this protection, the integrity of the adhesive layer 34 and its bonds with the segments 18 and the cylindrical surface 24 at the outer ends of the segment 18 is greatly enhanced. As a result, progressive peeling of the segments 18 from an initial bond failure at the outer ends thereof is substantially prevented. To further protect against such progressive failure, the layer 38 of adhesive material is provided in accordance with this invention between the annular planar surface 30 and the end surfaces 36 of the segments 18. Since, however, adhesive materials such as epoxies and polyimides have relatively low sheat modulii, it is not sufficient that there merely be provided a layer 38 of adhesive material. If the layer 38 were relatively large, say 0.250 inch, the layer 34, which in accordance with the aforesaid application Ser. No. 230,676 should not exceed 0.020 inch in thickness, would fail and be progressively peeling long before the radial movement of the outer end of the segment 18 would be sufficient to place any significant shear load on the bonds of the layer 38. To protect against progressive peeling, it is essential that the layer 38 relieve the layer 34 by carrying in shear a significant portion of the total force holding the segment 18 on the base member 16. To accomplish this, it has been found in accordance with the present invention that the layer 38 should also be relatively thin so that it is substantially stressed in shear during operation of the commutator in a dynamoelectric machine.

As taught in the aforesaid patent application Ser. No. 230,676, the thickness $t$ of the adhesive layer 34 must be maintained with a predetermined range relative to the diameter D of the base member 16. More particularly, it has been found in practice that the assembled commutator will substantially exhibit the mechanical and thermal stability characteristics of the base member 16 if the diameter D is maintained at least one hundred times as great as the thickness $t$. If the thickness $t$ is permitted to become relatively greater, the greater flexibility and the higher coefficient of expansion of the adhesive material will cause the characteristics of the integral commutator to depart noticeably and considerably from the characteristics of the base member.

Still more particularly, the commutating segments 18 should not be forced onto the cylindrical surface 17 of the base member 16 with sufficient force to squeeze the adhesive material from between the member. In other words, it has been found that a minimum thickness should be maintained. To assure that this minimum spacing is maintained, it is convenient to provide small glass beads 42 or other spacing means in the adhesive material to prevent the formation of a dry joint. In most applications, it is desirable that the beads 42 have a diameter of approximately 0.003 inch. In other cases, however, it may be desirable to permit the thickness $t$ to be as small as 0.001 inch, or it may be desirable to maintain a larger minimum spacing. On the other hand, it has been found that the thickness of the layer of adhesive material should not exceed approximately 0.020 inch. Since the base member 16 will normally have a diameter D of at least 2.000 inches, it will be seen that the desired relationship between $t$ and D will be maintained even at the minimum diameter D and the maximum thickness $t$. In accordance with this invention, it has been found that the layer 38 will be substantially stressed in shear during operation if it too is maintained at a thickness $t$ of 0.020 inch or less. A minimum thickness should also be maintained, the glass beads 42 or other spacers being useful for preventing the formation of a dry joint. While not absolutely essential, it is preferable that the two layers 34 and 38 have essentially the same thickness. In any event, the thickness of the layer 38 should be sufficiently small relative to the thickness of the layer 34 to assure that the bonds of the layer 38 will be substantially stressed in shear during operation.

In view of the foregoing, it will be seen that this invention provides an improved commutator for dynamoelectric machines in which the commutating segments are secured to a base member with a high degree of peel resistance.

The foregoing is a description of illustrative embodiments of the invention, and it is applicant's intention in the appended claims to cover all forms which fall within the scope of the invention.

What I claim as new and desire to secure by Letters Patent of the United States is:

1. For use in a dynamoelectric machine, a commutator comprising:

a base member having a mounting portion of substantial axial extent peripherally surrounding a central axis and an annular planar surface normal to said central axis at an end of said mounting portion, said annular planar surface axially facing said mounting portion, a plurality of elongated, electrically conductive commutating segments peripherally spaced about said mounting portion and secured thereto, each of said commutating segments having a planar surface at an end thereof parallel to and closely adjacent said annular planar surface, and a layer of high temperature resistant adhesive material interposed between the end planar surface of each of said commutating segments and said annular planar surface to bond said commutating segments to said annular planar surface, said adhesive material being electrically non-conductive and having high dielectric strength, the thickness of said layer of adhesive material being sufficiently small that the bonds of said layer with said annular planar surface and said end planar surface are substantially stressed in shear during operation of the commutator in a dynamoelectric machine.

2. A commutator as defined by claim 1 in which the thickness of said layer of adhesive material is in the range of 0.020 inch or less.

3. A commutator as defined by claim 1 in which said adhesive material is selected from the group of adhesives consisting of epoxies and polyimides.

4. A commutator as defined by claim 3 in which said mounting portion of said base member comprises a cylindrical outer surface, a layer of said adhesive material being interposed between each of said commutating segments and said cylindrical surface to adhesively bond said commutating segments to said cylindrical surface.

5. A commutator as defined by claim 4 in which said base member is formed of a material characterized by extreme rigidity and thermal stability relative to said adhesive material, the diameter of said cylindrical surface being at least one hundred times greater than the thickness of said layer of adhesive material so that the commutator substantially exhibits during operation in a dynamoelectric machine the mechanical and thermal stability characteristics of said base member.

6. A commutator as defined by claim 5 in which the diameter of said base member is at least 2.000 inches and the thickness of each of said adhesive layers between said commutating segments and, respectively, said cylindrical surface and said annular planar surface is in the range of 0.020 inch or less.

7. A commutator as defined by claim 6 further comprising spacing means disposed in said layer of adhesive material for establishing a minimum thickness of said adhesive layer.

8. A commutator as defined by claim 6 in which said base member is comprised of steel having a coating alumina on both said annular planar surface and said cylindrical surface.

* * * * *